(12) United States Patent
Rajab et al.

(10) Patent No.: US 10,916,125 B2
(45) Date of Patent: Feb. 9, 2021

(54) SYSTEMS AND METHODS FOR COOPERATIVE SMART LANE SELECTION

(71) Applicants: Honda Motor Co., Ltd., Tokyo (JP); The Regents of the University of California, Oakland, CA (US)

(72) Inventors: Samer Rajab, Novi, MI (US); Xue Bai, Novi, MI (US); Danyang Tian, Riverside, CA (US); Guoyuan Wu, Rancho Cucamonga, CA (US); Kanok Boriboonsomsin, Portland, OR (US); Matthew J. Barth, Riverside, CA (US)

(73) Assignees: Honda Motor Co., Ltd., Tokyo (JP); The Regents of the University of California, Oakland, CA (US)

( * ) Notice: Subject to any disclaimer, the term of this patent is extended or adjusted under 35 U.S.C. 154(b) by 32 days.

(21) Appl. No.: 16/049,237

(22) Filed: Jul. 30, 2018

(65) Prior Publication Data
US 2020/0035092 A1     Jan. 30, 2020

(51) Int. Cl.
*G08G 1/00* (2006.01)
*G08G 1/01* (2006.01)
*B60W 30/18* (2012.01)
*G05D 1/02* (2020.01)
*G05D 1/00* (2006.01)

(52) U.S. Cl.
CPC ..... *G08G 1/0125* (2013.01); *B60W 30/18163* (2013.01); *G05D 1/0088* (2013.01); *G05D 1/0212* (2013.01); *G08G 1/012* (2013.01); *B60W 2556/45* (2020.02); *G05D 2201/0213* (2013.01)

(58) Field of Classification Search
USPC .......................................... 701/25
See application file for complete search history.

(56) References Cited

U.S. PATENT DOCUMENTS

| | | |
|---|---|---|
| 6,556,916 B2 | 4/2003 | Waite et al. |
| 9,286,800 B2 | 3/2016 | Gordon |
| 9,406,229 B2 | 8/2016 | Basnayake et al. |
| 9,709,406 B2 | 7/2017 | Bastiaensen et al. |

(Continued)

FOREIGN PATENT DOCUMENTS

| | | |
|---|---|---|
| CN | 104781125 | 7/2015 |
| JP | 2002123894 | 4/2002 |

*Primary Examiner* — James M McPherson
(74) *Attorney, Agent, or Firm* — Rankin, Hill & Clark LLP (57) ABSTRACT

Systems and methods for cooperative smart lane selection are described. According to one embodiment, a computer-implemented method for cooperative smart lane selection includes receiving vehicle data for a plurality of vehicles. Each vehicle in the plurality of vehicles is travelling along a road segment having a plurality of lanes. The road segment is parsed into a plurality of inter-lane zones including a buffer zone and an implementation zone downstream of the buffer zone. Each inter-lane zone includes the lanes of the plurality of lanes. The computer-implemented method includes integrating the vehicle data into the plurality inter-lane zones by lane of the plurality of lanes. The computer-implemented method also includes calculating flow factors for the lanes in the implementation zone. The computer-implemented method further includes selecting a lane from the plurality of lanes based on the flow factors and controlling a host vehicle based on the flow factors.

17 Claims, 6 Drawing Sheets

(56) References Cited

U.S. PATENT DOCUMENTS

| | | | |
|---|---|---|---|
| 2011/0109475 A1* | 5/2011 | Basnayake | G08G 1/096716 340/902 |
| 2013/0275033 A1* | 10/2013 | Bastiaensen | G01C 21/26 701/119 |
| 2014/0278052 A1* | 9/2014 | Slavin | G01C 21/3492 701/400 |
| 2016/0027301 A1 | 1/2016 | Publicover | |
| 2017/0089717 A1 | 3/2017 | White et al. | |
| 2017/0313311 A1 | 11/2017 | Niino et al. | |
| 2017/0323566 A1* | 11/2017 | Suto | G01C 21/3658 |
| 2017/0369067 A1* | 12/2017 | Saigusa | B60W 30/18163 |
| 2018/0157257 A1* | 6/2018 | Hashimoto | G05D 1/0088 |
| 2018/0251155 A1* | 9/2018 | Chan | B62D 15/0255 |
| 2019/0322281 A1* | 10/2019 | Wang | G01C 21/3658 |

* cited by examiner

SYSTEMS AND METHODS FOR COOPERATIVE SMART LANE SELECTION

BACKGROUND

Vehicles traveling on multi-lane roadways may choose a lane based on the speed of the vehicles immediately ahead. However, the traffic further downstream can affect the speed of an upstream vehicle. For example, because faster upstream traffic in a lane eventually slows to the speed of slowest downstream vehicle in that lane, upstream vehicles may have to slow to an undesirable speed. Rather than slow to the speed of a downstream vehicle, an upstream vehicle may change lanes one or more times to get to a lane travelling at the desired speed of the upstream vehicle.

BRIEF DESCRIPTION

According to one aspect, a computer-implemented method for cooperative smart lane selection includes receiving vehicle data for a plurality of vehicles. Each vehicle in the plurality of vehicles is travelling along a road segment having a plurality of lanes. The road segment is parsed into a plurality of inter-lane zones including a buffer zone and an implementation zone downstream of the buffer zone. Each inter-lane zone includes each of the lanes of the plurality of lanes. The computer-implemented method includes integrating the vehicle data into the plurality of inter-lane zones by each lane of the plurality of lanes. The computer-implemented method also includes calculating flow factors for each lane of the plurality of lanes in the implementation zone. The computer-implemented method further includes selecting a kinematically similar lane from the plurality of lanes based on the flow factors and controlling a host vehicle to initiate a lane change maneuver based on the kinematically similar lane.

According to another aspect, a system for cooperative smart lane selection, includes a plurality of vehicles each equipped for computer communication via at least one communication network. Each vehicle in the plurality of vehicles is travelling along a road segment having a plurality of lanes. The road segment is parsed into a plurality of inter-lane zones including a buffer zone and an implementation zone downstream of the buffer zone. The system also includes a processor operatively connected for computer communication to the at least one communication network. The processor receives vehicle data for the plurality of vehicles transmitted over the at least one communications network and integrates the vehicle data into the plurality of inter-lane zones by each lane of the plurality of lanes. The processor also calculates flow factors for each lane of the plurality of lanes with respect to the implementation zone. Further, the processor selects a kinematically similar lane from the plurality of lanes in the implementation zone based on the flow factors and controls a host vehicle in the buffer zone based on the selection of the kinematically similar lane.

According to a further aspect, a non-transitory computer-readable storage medium including instructions that when executed by a processor, causes the processor to receive vehicle data for a plurality of vehicles. Each vehicle in the plurality of vehicles is travelling along a road segment including a plurality of lanes. The road segment being parsed into a plurality of inter-lane zones. Each inter-lane zone includes each of the lanes of the plurality of lanes. The host vehicle is in a first inter-lane zone of the plurality of inter-lane zones. The processor is further caused to integrate the vehicle data into the plurality of inter-lane zones by lane of the plurality of lanes. The processor is also caused to calculate flow factors for each of lanes with respect to a second inter-lane zone, of the plurality of inter-lane zones. The second inter-lane zone is downstream and adjacent to the first inter-lane zone. The processor is further caused to select a kinematically similar lane based on the calculated flow factors and control the host vehicle to initiate a lane change maneuver based on the kinematically similar lane.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings.

DETAILED DESCRIPTION

The systems and methods discussed herein are generally directed to using real-time vehicle data from remote vehicles using computer communication to provide cooperative smart lane selection and vehicle control of a host vehicle to initiate a lane selection maneuver. The cooperative smart lane selection can distribute the host vehicle to a kinematically similar lane that will allow the host vehicle to travel at or about their desired kinematics, for example, a desired speed. In one embodiment, the systems and methods can be used to distribute the host vehicle as well as one or more of the remote vehicles. By distributing vehicles to kinematically similar lanes based on their desired kinematics, the number of dangerous lane changes and the resulting traffic perturbations can be reduced.

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Over View Overview

Figure 1:
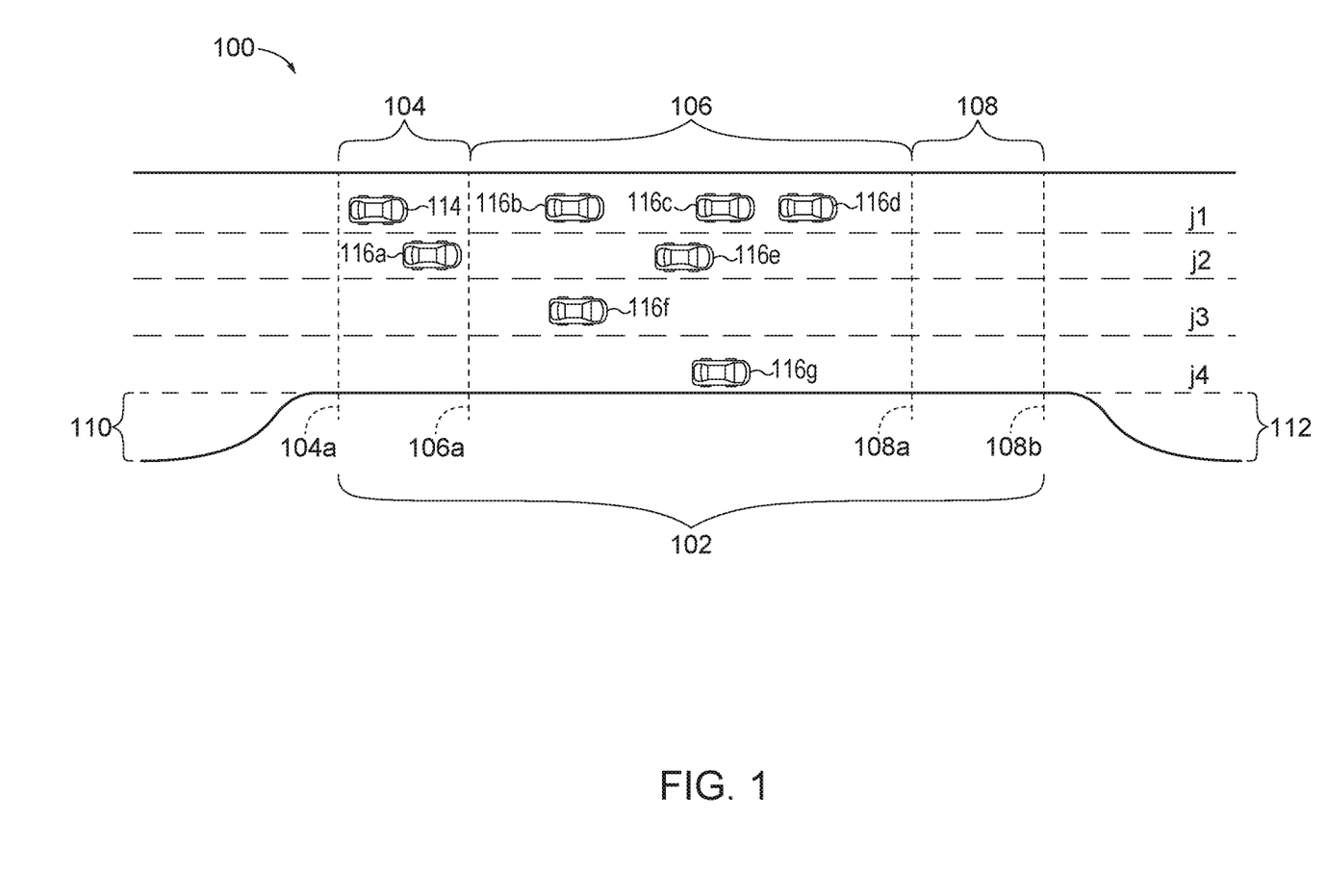
FIG. 1 is a schematic view of an exemplary traffic scenario on a road segment having a buffer zone, an implementation zone, and a discretionary zone according to one embodiment.

Referring now to the drawings, the drawings are for purposes of illustrating one or more exemplary embodiments and not for purposes of limiting same. FIG. 1 is a schematic view of an exemplary traffic scenario on a road segment 102 of a roadway 100 that will be used to describe cooperative smart lane selection according to one embodiment. The roadway 100 can be any type of road, highway, freeway, or travel route. In FIG. 1, the road segment 102 includes four lanes with vehicles traveling in the same longitudinal direction, namely, a lane $j_1$, a lane $j_2$, a lane $j_3$, and a lane $j_4$, however, it is understood that the road segment 102 can have various configurations not shown in FIG. 1 and can have any number of lanes.

In FIG. 1, the road segment 102 is parsed into a plurality of inter-lane zones including a buffer zone 104, an implementation zone 106, and discretionary zone 108. The inter-lane zones include a portion of the plurality of lanes, for example, an inter-lane zone may include a longitudinal portion of each of the lanes. Here, the buffer zone 104 includes a longitudinal portion of each of the lanes: $j_1$, $j_2$, $j_3$, and $j_4$. Likewise, the implementation zone 106 and the discretionary zone 108 also have longitudinal portions of the lanes: $j_1$, $j_2$, $j_3$, and $j_4$. In some embodiments, the inter-lane zones may be defined to include a consistent number of lanes such that each inter-lane zone has the same number of lanes.

The length of the longitudinal portions of the inter-lane zones may be defined by road features. The road features are features on the roadway 100 that affect the traffic pattern. For example, the road features may include an on-ramp, off-ramp, a lane ending, a collision, debris, a disabled vehicle, and a lane closure among other features that may cause a vehicle to alter its speed, direction, or lane on the roadway 100. Road features may be identified based on information received from a global positioning system of a position determination unit 218 (shown in FIG. 2), computer communication between vehicles traveling on the roadway 100, data received from applications integrated with the vehicle systems 208 (shown in FIG. 2), among others.

In one embodiment, the road segment 102 may begin after a road feature. In another embodiment, the road segment 102 may be situated between two road features, such that the inter-lane zones are arranged between road features. For example, suppose that the roadway 100 has road features including an on-ramp 110 and an off-ramp 112. The buffer zone 104, and accordingly the road segment 102, may begin at a buffer zone edge 104a at the end of the on-ramp 110. The buffer zone 104 ends at an implementation zone edge 106a which also demarcates the beginning of the implementation zone 106. The implementation zone ends at a first discretionary zone edge 108a which also demarcates the beginning of the discretionary zone 108. The discretionary zone 108 also has a second discretionary edge 108b that marks the end of the discretionary zone 108 and accordingly it is also the end of the road segment 102. Although the inter-lane zones are shown in contact with one another, in one embodiment, there may be spaces between the inter-lane zones and/or the road segment.

The lengths of the buffer zone 104 and the discretionary zone 108 may be shorter than the length of the implementation zone 106. In one embodiment, the length of the buffer zone 104 and the discretionary zone 108 may be predetermined and the length of the implementation zone 106 may be variable. In one embodiment, the length of the implementation zone 106 may be based on length of the road segment 102 in the absence of the predetermined lengths of the buffer zone 104 and the discretionary zone 108. For example, suppose the buffer zone edge 104*a* is situated to at the end of a road feature, such as the on-ramp 110. The buffer zone 104 may have a predetermined length of 0.5 miles, and the discretionary zone 108 may also have a predetermined length of 0.5 miles. Suppose the road segment 102 is 3 miles in length, consequently, the length of the implementation zone would be 2 miles.

In another embodiment, the lengths of the inter-lane zones may be based on predetermined percentages of the length of the road segment 102. For example, the length of the buffer zone 104 may be 25% of the length of the road segment 102, the length of the implementation zone 106 may be 65% of the length of the road segment 102, and the length of the discretionary zone 108 may be 10% of the length of the road segment 102. Accordingly, the length of an inter-lane zone may be dependent on the length of the road segment and interdependent on the length of the other inter-lane zones.

The beginning and the end of the road segment 102 may be based on the type of road feature. For example, some road features may be temporary such as a lane closure or disabled vehicle, while others are fixed, such as the on-ramp 110 and the off-ramp 112. In one embodiment, the road segment 102 may begin at the buffer zone edge 104*a* a first distance from temporary road features and end at a second distance from fixed road features that is different from the first distance. The first distance may be different than the second distance because the first road feature is a temporary road feature while the second road feature is a fixed road feature. In these ways, the road features may affect the way that the inter-lane zones are segmented on the road segment 102.

The buffer zone 104 provides an opportunity for the host vehicle 114 to establish communication with remote vehicles on the roadway 100 and receive vehicle data from the remote vehicles. In some embodiments, the host vehicle may move to a selected zone so that the host vehicle 114 is able to travel in the selected kinematically similar lane through the implementation zone 106 and conceivably for as long as possible. The discretionary zone 108 provides a space for the host vehicle 114 to make a lane change maneuver based on a navigation preference associated with a road feature. For example, suppose the host vehicle 114 wishes to exit the roadway 100 at the off-ramp 112, the host vehicle 114 may move from the selected kinematically similar lane to a lane that will allow the host vehicle to exit the roadway 100 accordingly.

A plurality of vehicles (e.g., host vehicle(s), remote vehicle(s)) are travelling along the road segment 102, namely, a host vehicle 114, a remote vehicle 116*a*, a remote vehicle 116*b*, a remote vehicle 116*c*, a remote vehicle 116*d*, and a remote vehicle 116*e*, a remote vehicle 116*f*, and a remote vehicle 116*g*, although it is appreciated that any number of vehicles can be present on the road segment 102.

For purposes of illustration, each vehicle shown in FIG. 1 is equipped for computer communication as defined herein. One or more of the vehicles may not be equipped for computer communication and/or not equipped with the cooperative smart lane selection methods and systems discussed herein. However, the methods and systems can perform cooperative smart lane selection based on the information received from connected vehicles even with a partial penetration rate, as will be discussed in more detail below.

By crowd-sourcing vehicle data from and/or about remote vehicles, it is possible to select lanes for vehicles in order to better distribute the vehicles on the roadway 100 based on the vehicles' kinematics. The systems and methods will be described with respect to a host vehicle 114 for clarity. However, any or all of the remote vehicles 116*a*-116*g* may also act as host vehicles such that the remote vehicles are provided a kinematically similar lane selection and controlled to initiate a lane selection maneuver. A lane selection maneuver may be providing a lane selection recommendation, providing road feature information, and/or semi-autonomous and fully autonomous responses can be provided to the host vehicle 114.

Figure 2:
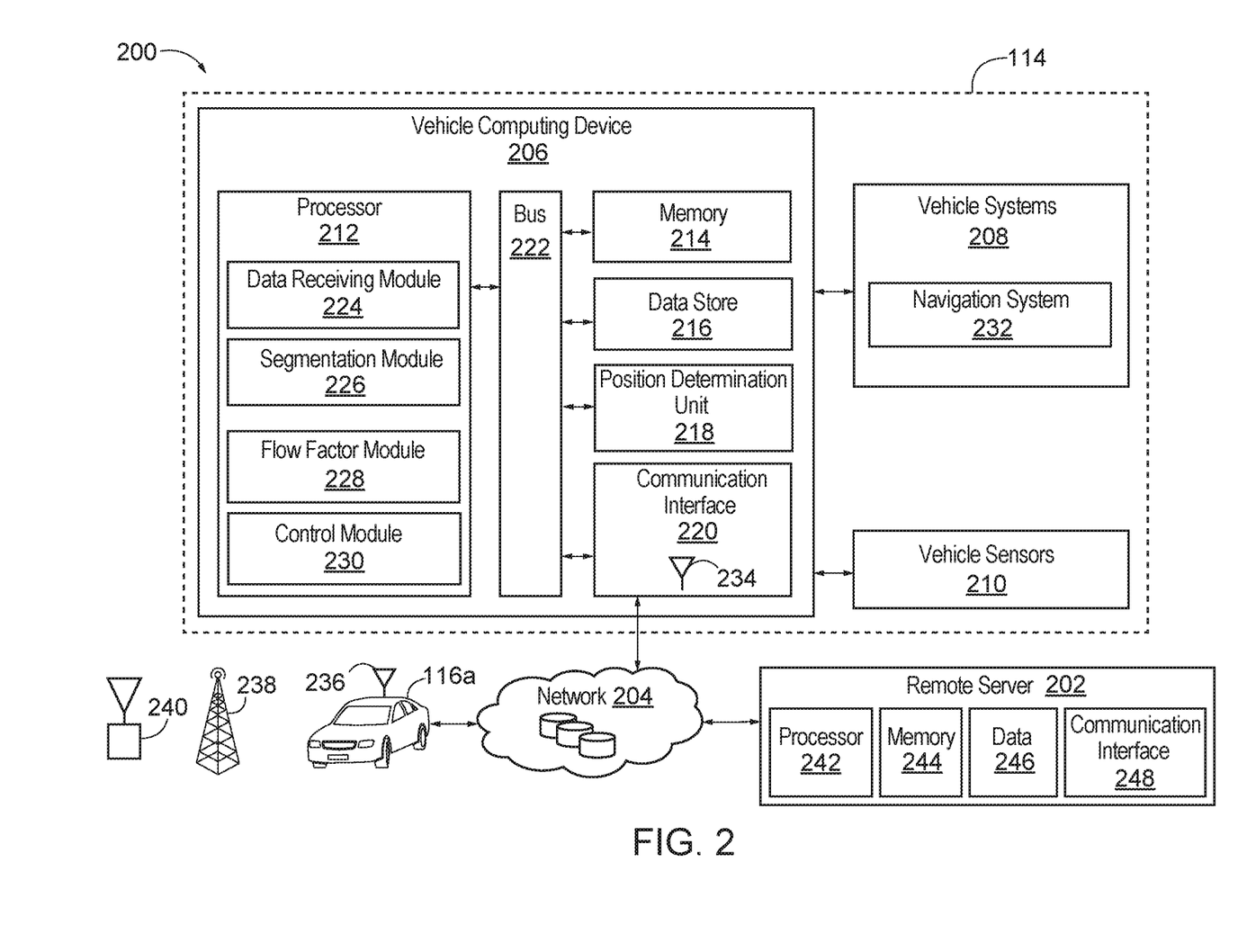
FIG. 2 is a block diagram of an operating environment for implementing cooperative smart lane selection according to an exemplary embodiment.

Referring now to FIG. 2, a schematic view of an operating environment 200 for a host vehicle 114 according to an exemplary embodiment is shown. One or more of the components of the operating environment 200 can be considered in whole or in part a vehicle communication network. In FIG. 2, a block diagram of the host vehicle 114 is shown with a simplified diagram of the remote vehicle 116*a*, a block diagram of a remote server 202, and a communications network 204. It is understood that the remote vehicle 116*a*, the remote vehicle 116*b*, the remote vehicle 116*c*, the remote vehicle 116*d*, the remote vehicle 116*e*, the remote vehicle 116*f*, the remote vehicle 116*g*, and/or the remote server 202 can include one or more of the components and/or functions discussed herein with respect to the host vehicle 114. Thus, although not shown in FIG. 2, one or more of the components of the host vehicle 114, can also be implemented with that the remote vehicle 116*a*, the remote vehicle 116*b*, the remote vehicle 116*c*, the remote vehicle 116*d*, the remote vehicle 116*e*, the remote vehicle 116*f*, the remote vehicle 116*g*, and/or the remote server 202, other entities, traffic indicators, and/or devices (e.g., V2I devices, V2X devices) operable for computer communication with the host vehicle 114 and/or with the operating environment 200. Further, it is understood that the components of the host vehicle 114 and the operating environment 200, as well as the components of other systems, hardware architectures, and software architectures discussed herein, can be combined, omitted, or organized into different architectures for various embodiments.

In FIG. 2, the host vehicle 114 includes a vehicle computing device (VCD) 206, vehicle systems 208, and sensors 210. Generally, the VCD 206 includes a processor 212, a memory 214, a data store 216, a position determination unit 218, and a communication interface 220, which are each operably connected for computer communication via a bus 222 and/or other wired and wireless technologies defined herein. Referring again to the host vehicle 114, the VCD 206, can include provisions for processing, communicating, and interacting with various components of the host vehicle 114 and other components of the operating environment 200, including the remote vehicle 116*a* and the remote server 202. In one embodiment, the VCD 206 can be implemented with the host vehicle 114, for example, as part of a telematics unit, a head unit, an infotainment unit, an electronic control unit, an on-board unit, or as part of a specific vehicle control system, among others. In other embodiments, the VCD 206 can be implemented remotely from the host vehicle 114, for example, with a portable device (not shown), a remote device (not shown), or the remote server 202, connected via the communications network 204.

The processor 212 can include logic circuitry with hardware, firmware, and software architecture frameworks for facilitating cooperative smart lane selection and control of the host vehicle 114 and/or the remote vehicle 116a. Thus, in some embodiments, the processor 212 can store application frameworks, kernels, libraries, drivers, application program interfaces, among others, to execute and control hardware and functions discussed herein. For example, the processor 212 can include a data receiving module 224, a segmentation module 226, a lane selection module 228, and a control module 230, although it is understood that the processor 212 can be configured into other architectures. Further, in some embodiments, the memory 214 and/or the data store 216 can store similar components as the processor 212 for execution by the processor 212.

The position determination unit 218 can include hardware (e.g., sensors) and software to determine and/or acquire position data about the host vehicle 114. For example, the position determination unit 218 can include a global positioning system (GPS) unit (not shown) and/or an inertial measurement unit (IMU) (not shown). Thus, the position determination unit 218 can provide a geo-position of the host vehicle 114 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other sensors (not shown). In some embodiments, the position determination unit 218 can be a component of the navigation system 232 of the vehicle systems 208 that provides navigation maps and navigation information to the host vehicle 114.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the communication network 204.

More specifically, in one embodiment, the VCD 206 can exchange data and/or transmit messages with other compatible vehicles and/or devices via a transceiver 234 or other communication hardware and protocols. For example, the transceiver 234 can exchange data with the remote vehicle 116a via a remote vehicle transceiver 236. In some embodiments, the host vehicle 114 and the remote vehicle 116a can also exchange data (e.g., vehicle data as described herein) over remote networks by utilizing a wireless network antenna 238, roadside equipment 240, and/or the communication network 204 (e.g., a wireless communication network), or other wireless network connections.

As mentioned above, in some embodiments, data transmission can be executed at and/or with other infrastructures and servers. For example, the VCD 206 can transmit and receive information, such as roadway data or vehicle data, directly or indirectly to and from the remote server 202 over the communication network 204. The remote server 202 can include a remote processor 242, a memory 244, data 246, and a communication interface 248 that are configured to be in communication with one another. Thus, the transceiver 234 can be used by the VCD 206 to receive and transmit information to and from the remote server 202 and other servers, processors, and information providers through the communication network 204. In alternative embodiments, the transceiver 234 may be a radio frequency (RF) transceiver can be used to receive and transmit information to and from the remote server 202. In some embodiments, the VCD 206 can receive and transmit information to and from the remote server 202 including, but not limited to, vehicle data, traffic data, road data, curb data, vehicle location and heading data, high-traffic event schedules, weather data, or other transport related data. In some embodiments, the remote server 202 can be linked to multiple vehicles (e.g., the remote vehicle 116a), other entities, traffic infrastructures, and/or devices through a network connection, such as via the wireless network antenna 238, the roadside equipment 240, and/or other network connections.

In this manner, vehicles that are equipped with cooperative smart lane selection systems may communicate via transceiver 234 and the remote vehicle transceiver 236 if the vehicles are in transceiver range. Alternatively, the vehicles may communicate by way of remote networks, such as the communications network 204, the wireless network antenna 238, and/or the roadside equipment 240. For example, suppose the remote vehicle 116c, the remote vehicle 116d, the remote vehicle 116e, and the remote vehicle 116g are out of transceiver range of the host vehicle 114. The other remote vehicles, including the remote vehicle 116a, the remote vehicle 116b, and the remote vehicle 116f may communicate with the host vehicle using the transceiver 234 and the remote vehicle transceiver 236. The out of range vehicles may communicate with the host vehicle via a cellular network using the wireless network antenna 238.

In another embodiment, one or more of the remote vehicles may not be capable of computer communication. Suppose the remote vehicle 116d is not capable of computer communication, then another vehicle, such as remote vehicle 116c or remote vehicle 116e, may relay the kinematics of the remote vehicle 116d to the host vehicle 114. For example, the remote vehicle 116c may use ranging sensors, such as light detection and ranging (LiDAR) sensors, to measure the kinematics of the remote vehicle 116d and send the measured kinematics and a vehicle identifier to the host vehicle 114 using the wireless network antenna 238.

Referring again to the host vehicle 114, the vehicle systems 208 can include any type of vehicle control system and/or vehicle described herein to enhance the host vehicle 114 and/or driving of the host vehicle 114. For example, the vehicle systems 208 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). As will be described, one or more of the vehicle systems 208 can be controlled according the systems and methods discussed herein.

The sensors 210, which can be implemented with the vehicle systems 208, can include various types of sensors for use with the host vehicle 114 and/or the vehicle systems 208 for detecting and/or sensing a parameter of the host vehicle 114, the vehicle systems 208, and/or the environment surrounding the host vehicle 114. For example, the sensors 210 can provide data about vehicles and/or downstream objects in proximity to the host vehicle 114. For example, the sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the sensors 210 can be any type of sensor, for example, acoustic, electric, environmental, optical, imaging, light, pressure, force, thermal, temperature, proximity, among others.

Using the system and network configuration discussed above, cooperative smart lane selection and vehicle control can be provided based on real-time information from vehicles using vehicular communication. Detailed embodiments describing exemplary methods using the system and network configuration discussed above will now be discussed in detail.

II. Methods for Cooperative Smart Lane Selection

Figure 3:
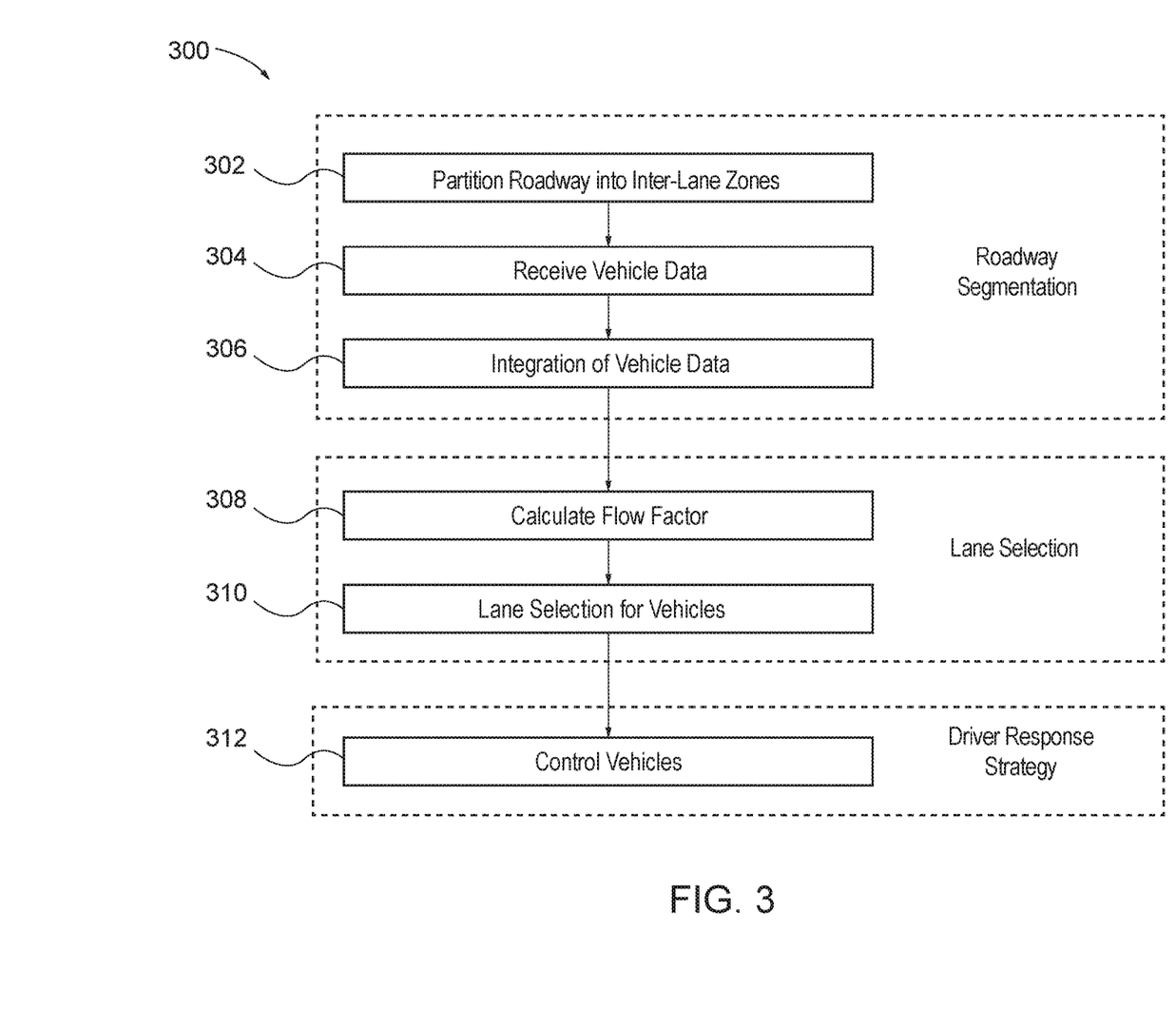
FIG. 3 is a process flow for cooperative smart lane selection according to one embodiment.

Referring now to FIG. 3, a method 300 for cooperative smart lane selection will now be described according to an exemplary embodiment. FIG. 3 will also be described with reference to FIGS. 1, 2, 4, and 5. As shown in FIG. 3, the method for cooperative smart lane selection can be described by three stages, namely, roadway segmentation, lane selection, and driver response strategy. For simplicity, the method 300 will be described by these stages, but it is understood that the elements of the method 300 can be organized into different architectures, blocks, stages, and/or processes.

A. Roadway Segmentation

Figure 4:
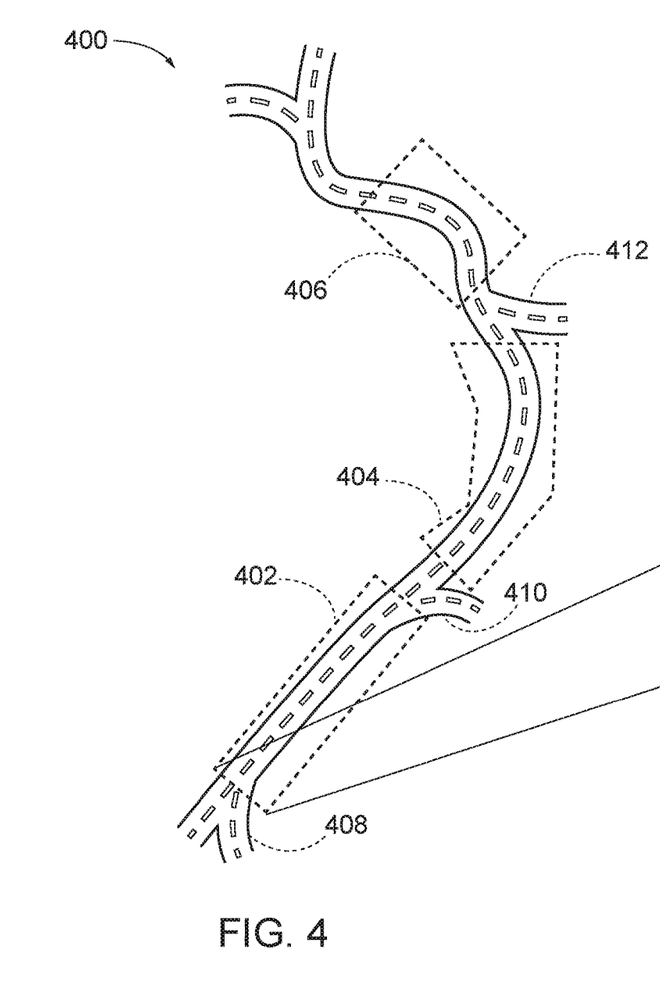
FIG. 4 is a schematic view of an example roadway having multiple road segments according to an exemplary embodiment.

At block 302, the method 300 includes partitioning a roadway into road segments. Referring to FIG. 4, a roadway 400 is partitioned into segments such as a first segment 402, a second segment 404, and a third segment 406. As shown, the roadway segments may have different lengths. For example, the first segment 402 and the second segment 404 are longer than the third segment 406. The roadway 400 may be partitioned based on road features as described above. The road features may include ramps, like on-ramp 408 and the off-ramps 410 and 412, or the number of lanes increasing or decreasing on the roadway 400.

The segmentation module 226 partitions the roadway 400 into the roadway segments based on segmentation data. The segmentation data is generally information regarding partitioning of the roadway 400 into roadway segments and may include information regarding location of roadways segments, road features, length of roadway segments, parameters for segmentation, etc. The segmentation data may be received at the data receiving module 224 from remote vehicles on the roadway 400 as computer communication, from vehicle systems 208 such as the navigation system 232, or a global positioning system (not shown) of the position determination unit 218, among others.

In addition to partitioning the roadway 400 into roadway segments, the roadway segments may be further partitioned into inter-lane zones. For example, the first segment 402, of FIG. 4, is shown in greater detail in FIG. 5. In particular, the first segment 402 has two inter-lane zones: a buffer zone 502 and an implementation zone 504. As discussed above, some inter-lane zones may have a predetermined length while others have a variable length based on the length of the roadway segment. For example, the buffer zone 502 may be 300 meters in length and the implementation zone 504 is the remainder of the first segment 402. Thus, the buffer zone 502 has a predetermined length while the implementation zone 504 has a variable length.

Figure 5:
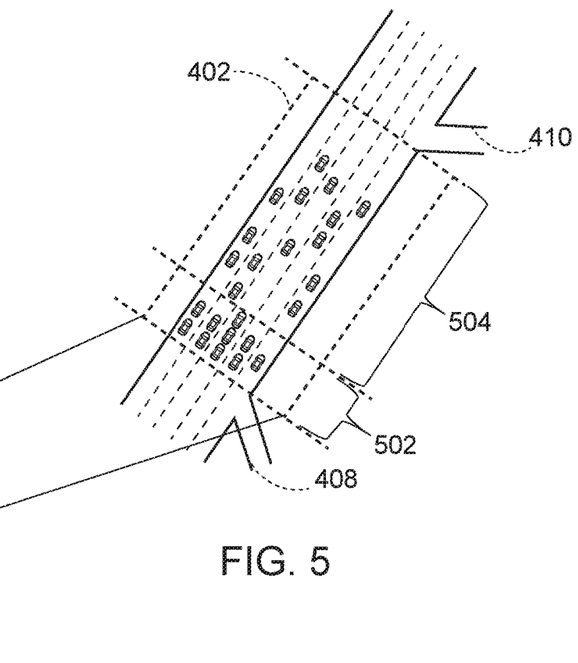
FIG. 5 is a schematic view of an exemplary traffic scenario on a road segment having a buffer zone and an implementation zone according to one embodiment.

The arrangement of the inter-lane zones may vary by road segment. For example, here, the implementation zone 504 extends to the off-ramp 410. The second segment 404 may have a different arrangement than that of the first segment 402. For example, the second segment 404 may include a discretionary zone in a similar manner as the road segment 102 shown in FIG. 1, in which the implementation zone 106 is separated from the off-ramp 112 by a discretionary zone 108.

At block 304, the method 300 includes receiving vehicle data. For example, the data receiving module 224 can receive vehicle data about one or more of the remote vehicles travelling along the road segment 102 (e.g., the host vehicle 114, the remote vehicle 116a, the remote vehicle 116b, the remote vehicle 116c, the remote vehicle 116d, the remote vehicle 116e, the remote vehicle 116f, and the remote vehicle 116g) using computer communication including over cellular based wireless networks as described above with FIG. 2. In some embodiments, the vehicle data may include vehicle type recognition to improve communication with a remote vehicle. For example, the vehicle type data may distinguish between conventional vehicles with limited, if any, communication ability, cellular-enabled vehicles that can communicate over cellular based wireless networks, and application enabled vehicles that communicate directly with other application enabled vehicles.

Vehicle data can include speed, acceleration, velocity, yaw rate, steering angle, and throttle angle, range or distance data, among others. The vehicle data can also include course heading data, course history data, projected course data, kinematic data, current vehicle position data, and any other vehicle information about the remote vehicles and the environment surrounding the remote vehicles.

The data receiving module 224 collects the vehicle data on spatial and temporal domains, and partitions (e.g., integrates) the vehicle data into the inter-lane zones by lane (e.g., longitudinally) and into time slices (e.g., multiple of time steps). Accordingly, at block 306, the method 300 includes data integration of vehicle data into the plurality of lanes and inter-lane zones partitioned at block 302. In some embodiments, the data integration and temporal resolution is performed at a predetermined time interval, for example, 20 seconds. Accordingly, the vehicle data can be used to identify the kinematics and position information, including which lane of which inter-lane zone, in which a vehicle is traveling.

B. Lane Selection

Based on the vehicle data, at block 308, the method 300 includes calculating a flow factor for each lane in a next inter-lane zone. For example, suppose the host vehicle 114 is in the buffer zone 104 such that the next zone is the implementation zone 106. A flow factor may be calculated for each of the lanes $j_1$, $j_2$, $j_3$, and $j_4$ in the implementation zone 106. The flow factor indicates how traffic is flowing in the associated lane. In some embodiments, the flow factor is the downstream lane-level average speed. The flow factor may also be the downstream lane-level density, downstream lane-level acceleration, etc. In one embodiment, the lane selection module 228 can extract and identify the vehicle data deemed to be representative for calculating the flow factor. In some embodiments, calculating the flow factors is based on a machine learning model of the vehicle data.

Using these flow factors for the lanes $j_1$, $j_2$, $j_3$, and $j_4$, the system can identify a kinematically similar lane that has a flow suited to the host vehicle 114 and the lane selection module 228 can select the kinematically similar lane at block 310. For example, suppose the flow factor is the downstream lane-level average speed, the lane selection module 228 may compare the calculated flow factors for each of the lanes to a desired kinematic factor such as the desired speed of the host vehicle. In this manner, the desired kinematic factor may correspond to the flow factor. By comparing the calculated flow factors for each of lanes in the implementation zone to a desired kinematic factor, the kinematically similar lane having a flow factor that approximates the desired kinematic factor can be identified.

In some embodiments, the flow factor may be a range because the desired kinematic factor may not match the flow factor for any of the lanes. For example, the flow factor for a lane may be calculated as a value, such as the average downstream speed of the lane in a specific inter-lane zone. The flow factor may also include a range of values about the calculated value to include a predetermined amount of variance. For example, suppose the calculated downstream lane-level average speed of the lane $j_3$ is 57 mph (miles per hour), the flow factor may be 57 mph+/−2 mph such that the flow factor for the lane $j_1$ is the range 55-59 mph. The flow factor approximates the desired kinematic factor when the desired kinematic factor falls within the range of the flow factor.

In some embodiments, the flow factor for two or more lanes may overlap. For example, suppose the flow factor for the lane $j_3$ is the range 55-59 mph, the flow factor for the lane $j_2$ is the range 57-61 mph, and the desired kinematic factor is to travel at 57 mph. As described above, the lane having the flow factor with a calculated value closest to the desired kinematic factor (i.e., has a mean value that best approximates the desired kinematic factor) may be selected. Accordingly, the lane $j_3$ may be selected as the kinematically similar lane.

In another embodiment, the desired kinematic factor may also include multiple driving considerations. For example, in addition to a desired speed, the desired kinematic factor may include a proximity preference. Suppose that the host vehicle 114 has a desired kinematic factor of 57 mph with a proximity preference. Once it is determined that flow factors for both the lanes $j_2$ and $j_3$ satisfy the desired kinematic factor of 57 mph based on the range, the lane $j_2$ may be selected as the kinematically similar lane because it is closer to the lane $j_1$ of host vehicle that the lane $j_3$. Thus, the desired kinematic factor may incorporate multiple driving considerations that are tiered.

The desired kinematic factor may be received from the driver through input to a vehicle system 208, such as the navigation system 232. Alternatively, the desired kinematic factor may be based on historical sensor data from the vehicle sensors, current sensor data, or a selected driving mode among others. The desired kinematic factor may include downstream lane-level density, downstream lane-level acceleration, downstream lane-level speed, proximity to current lane, etc.

C. Driver Response Strategy

Based on the selection of kinematically similar lane, various driver response strategies can be executed using vehicle control. Accordingly, at block 312, the method 300 includes controlling one or more vehicles based on the selection of the kinematically similar lane. For example, the control module 230 can control one or more vehicle systems 208 based lane selection of the host vehicle 114. For example, lane selection information and/or lane maneuver suggestions to move to the selected lane can be provided to a human machine interface of the host vehicle 114, such as a vehicle display (not shown) or audio and/or visual alert.

Additionally, semi-autonomous and fully autonomous responses can be provided to the host vehicle 114. For example, control of lateral movement of the host vehicle 114 to initiate a lane change to adjacent lane $j_3$, lane $j_2$, or lane $j_1$. This control can also be performed based on the beginning or the end of an inter-lane zone. For example, while the lane selection module 228 may select a lane in the buffer zone 104, the control module 230 may not control the vehicle based on the lane selection until the host vehicle 114 is in the implementation zone 106. Alternatively, the control module 230 may control the host vehicle 114 as soon as the lane selection module 228 selects a lane.

Additionally, the cooperative smart lane selection equipped vehicles in the other lanes can also be guided and/or controlled to not change lanes such that vehicles can be distributed into lanes to improve traffic flow. Other types of control can also be implemented. For example, the speed of one or more of the remote vehicles can be controlled in a cooperative manner to further smooth traffic flow and patterns of upstream traffic flow to minimize the impact of traffic congestion, slow or disabled vehicles, etc.

While the FIGS. 1, 2, and 3 are described with regard to the host vehicle 114, the systems and methods can also function with respect to one or more of the remote vehicles. For example, in one embodiment, one or more of the remote vehicles are also equipped with systems and methods for cooperative smart lane selection. Suppose, a group of cooperative smart lane selection-equipped vehicles are within vicinity of each other (e.g., inside the buffer zone). Flow factors are calculated for the lanes in a downstream inter-lane zone, such as an implementation zone. The one or more vehicles can be clustered into similar-desired-kinematic (e.g., speed, proximity, density) subgroups. The number of sub-groups may be based on the number of lanes in the roadway 100. The number of vehicles in each "similar-desired-speed" subgroup depends on the calculated flow factors for the lanes. In this manner, the one or more vehicles are distributed to the lane that will likely allow them to travel at or approximately at their desired kinematic factor through a downstream kinematic inter-lane zone.

The inter-lane zones have been described with respect to different types of a zones. For example, a buffer zone 104, and implementation zone 106, and a discretionary zone 108, as described with respect to FIG. 1. However, in other embodiments, the zones may be more similar. For example, in FIG. 6 a roadway 600 has a first inter-lane zone 602, a second inter-lane zone 604, and a third inter-lane zone 606. The roadway 600 includes a number of vehicles that may be conventional vehicles having limited, if any, communication ability, have V2V communication ability such that the vehicles can communicate directly with one another or over a cellular wireless network 608, or be cooperative smart lane selection enabled vehicles.

Figure 6:
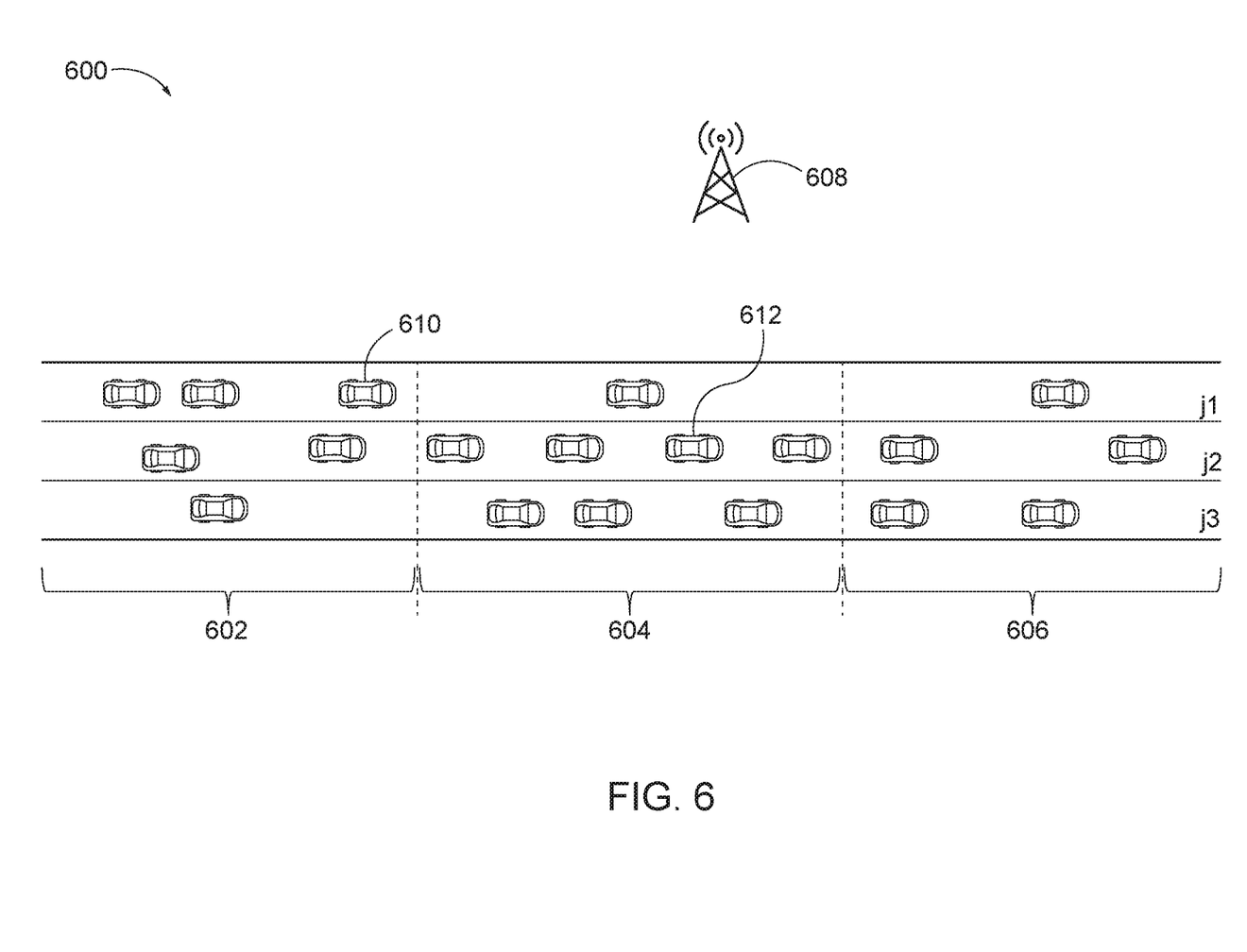
FIG. 6 is a schematic view of an exemplary traffic scenario on a road segment having a plurality of inter-lane zones according to one embodiment.

The first inter-lane zone 602, the second inter-lane zone 604, and the third inter-lane zone 606 may have a predetermined length or be variable based on road features. In some embodiments, first inter-lane zone 602, the second inter-lane zone 604, and the third inter-lane zone 606 may have approximately the same length. Additionally, the first inter-lane zone 602, the second inter-lane zone 604, and the third inter-lane zone 606 may have the features of both the buffer zone 104 and the implementation zone 106. For example, a host vehicle 610 in lane $j_1$ of the first inter-lane zone 602 may use flow factors calculated for the lanes of the second inter-lane zone 604 to select a kinematically similar lane. Likewise, a host vehicle 612 in in lane $j_2$ of the second inter-lane zone 604 may use flow factors calculated for the lanes of the third inter-lane zone 606 to select a kinematically similar lane. In this manner, vehicles can use flow factors calculated for an adjacent downstream lane.

IV. Simulation and Results

The system and methods discussed herein were validated using a hypothetical road segment in order to test general lane level maneuvers and cooperative smart lane selection. The hypothetical road segment used was a three-mile-long freeway segment with five lanes. With the hypothetical road segment, simulation tests were conducted under various V2X network penetration rates and different level traffic congestion levels. The detailed parameters used include V2X network-based connected vehicle (CV) penetration rate and traffic volume. With respect to V2X network-based CV penetration rate, cellular network market penetration rate is indicative of the number of vehicles that are capable computer communication for cooperative smart lane selection. A full penetration rate (i.e., 100%) enables cooperative smart lane selection to achieve accurate measurements, which leads to higher prediction accuracy and shorter reaction time. However, such an ideal case may not be achieved immediately, and the sensitivity analysis over different levels of penetration rate becomes meaningful. Accordingly, ten levels of penetration rate, i.e., 0%, 1%, 5%, 10%, 20%, 50%, 100% communication-capable vehicles were evaluated in terms of mobility (average speed difference) and safety (conflict frequency difference) under three levels of traffic volumes, i.e., light traffic, moderate traffic, and heavy traffic.

Figure 7:
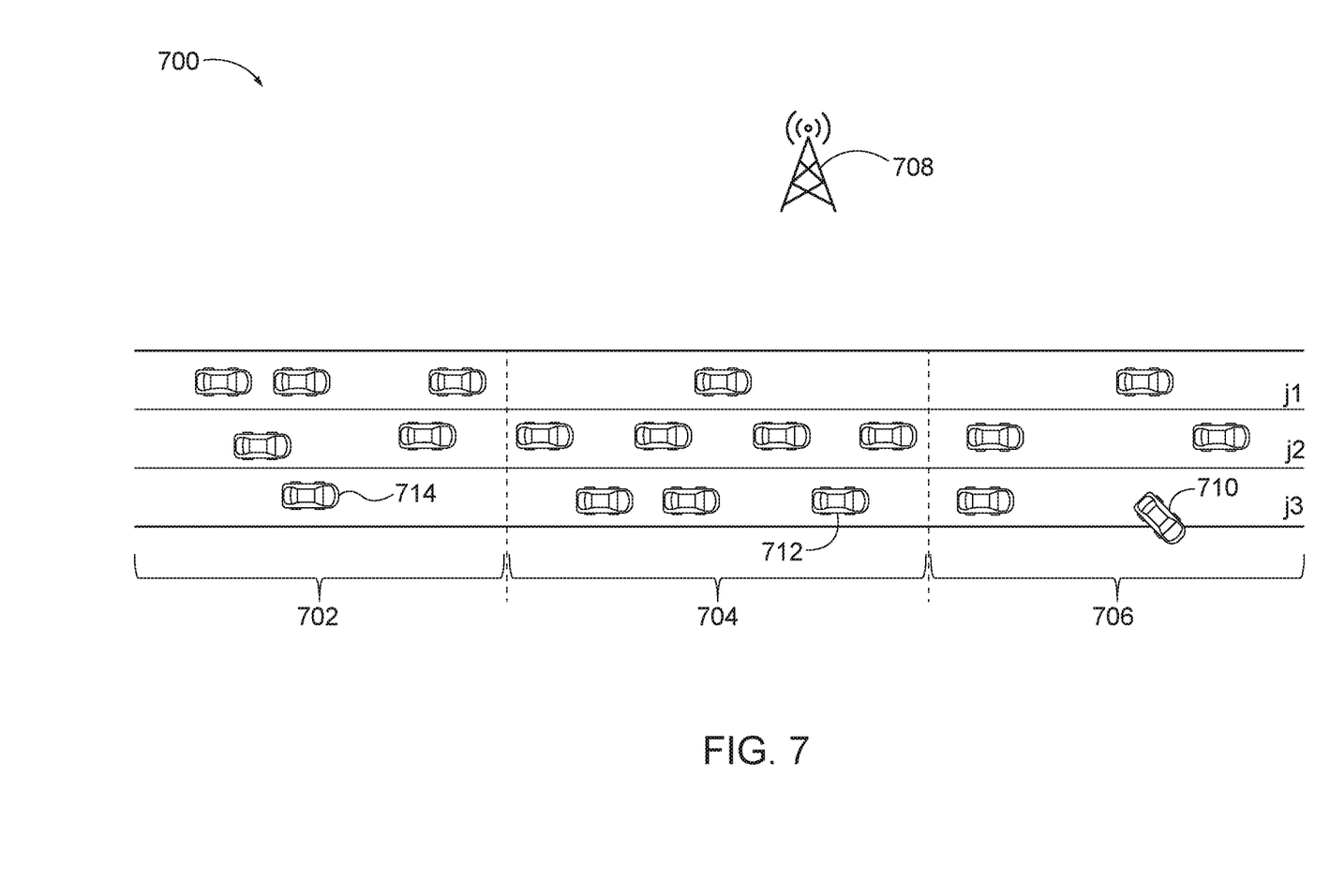
FIG. 7 is a schematic view of an exemplary traffic scenario on a road segment having an obstacle according to one embodiment.

In the simulation, there was a demonstrable benefit for vehicles, at varying penetration rates, in obstacle scenarios. FIG. 7 is a schematic view of an exemplary traffic scenario on a road segment having an obstacle according to one embodiment. For example, in FIG. 7, a roadway 700 has a first inter-lane zone 702, a second inter-lane zone 704, and a third inter-lane zone 706. The roadway 700 includes a number of vehicles that may be conventional vehicles having limited, if any, communication ability, have V2V communication ability such that the vehicles can communicate directly with one another or over a cellular wireless network 708, or be cooperative smart lane selection enabled vehicles.

An obstacle scenario is a scenario in which there is an obstacle 710 on the roadway 700. The obstacle 710 may be any of one or more objects in the roadway 700 and may include pedestrians crossing the roadway, other vehicles, animals, debris, potholes, etc. Further, the obstacle 710 may include most any traffic conditions, road conditions, weather conditions, buildings, landmarks, obstructions in the roadway, road segments, intersections, etc. Here, the obstacle 710 is illustrated as a disabled vehicle in the third inter-lane zone 706. The obstacle 710 may significantly change the flow factor of one or more lanes. For example, the obstacle 710 may reduce the flow factor of lane $j_3$ and possibly of lane $j_2$. In some embodiments, the effect of the obstacle 710 on the flow factor of an inter-lane zone of a lane may be inversely proportional to distance from the obstacle 710.

As discussed above, cooperative smart lane selection enabled vehicles can move from the lane $j_3$ to a selected lane based on the flow factor as compared to the desired kinematic factor. For example, a first host vehicle 712 in lane $j_3$ of the second inter-lane zone 704 may use flow factors calculated for the lanes of the third inter-lane zone 706 to select a kinematically similar lane. Thus, the first host vehicle 712 may initiate a lane change maneuver to lane $j_2$ supposing that lane $j_2$ may be kinematically similar since it is further removed from the obstacle 710. Likewise, a second host vehicle 714 in lane $j_3$ of the first inter-lane zone 702 may use flow factors calculated for the lanes of the second inter-lane zone 704 to select a kinematically similar lane. In this manner, vehicles further downstream of the obstacle 710 can move to a kinematically similar lane before encountering the obstacle and/or the effects of the obstacle on the traffic pattern of the roadway 700. This was demonstrated in the simulations which showed that, in obstacle scenarios, host vehicles can anticipate obstacles and maneuver accordingly before the obstacles present significant mobility effects, such as reduced speeds.

Initiating a lane change maneuver further downstream relative to the obstacle also reduces the conflict frequency for the downstream vehicle by reducing the number of lane changes in proximity to the obstacle. Conflict frequency describes the number of incidents that present an increased probability of collision, which may be based on relative speed, distance between vehicles, sensor data, etc. The area around an obstacle can become a bottleneck causing vehicles to be in greater proximity to one another, and thus, results in a higher conflict frequency. However, initiating a lane changes earlier, based on flow factors, allows vehicles to address the obstacle before reaching the inter-lane zone of the obstacle, thereby reducing the possibility of a bottleneck and consequently the conflict frequency.

In the simulation, cooperative smart lane selection equipped vehicles (e.g., vehicles equipped for computer communication and cooperative smart lane selection according to the systems and methods described herein) was set to each of the ten levels of penetration rate out of connected vehicles based on a V2X network. Therefore, there are three types of vehicles running in the simulation network, cooperative smart lane selection equipped vehicles, V2X-only vehicles, and conventional vehicles.

Cooperative smart lane selection equipped vehicles are vehicles which can not only exchange information, but also select a lane based on flow factors calculated for the lanes. V2X-only vehicles are vehicles that can exchange their real-time information (e.g., speed, lane level position) with other V2X network based connected vehicles, but without on-board applications. Conventional vehicles were vehicles without V2V communication ability and their behaviors follow the simulation software by-default lane and car following model. The simulation period for each run was set at 3600 seconds.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for cooperative smart lane selection, comprising:
receiving vehicle data for a plurality of vehicles, wherein each vehicle in the plurality of vehicles is travelling along a road segment including a plurality of lanes, the road segment being parsed into a plurality of inter-lane zones including a buffer zone and an implementation zone downstream of the buffer zone, wherein each inter-lane zone includes each lane of the plurality of the lanes;

integrating the vehicle data into the plurality of inter-lane zones by each lane of the plurality of lanes;

calculating flow factors for each lane of the plurality of lanes in the implementation zone;

selecting a kinematically-similar lane from the plurality of lanes based on the flow factors; and controlling a host vehicle to initiate a lane change maneuver based on the kinematically-similar lane.

2. The computer-implemented method of claim 1, wherein the vehicle data is received from a remote network, and wherein the remote network is a cellular network.

3. The computer-implemented method of claim 1, wherein a flow factor of the flow factors is an average speed of a lane.

4. The computer-implemented method of claim 1, wherein the plurality of inter-lane zones includes a discretionary zone bounded by the implementation zone and a road feature.

5. The computer-implemented method of claim 4, wherein the road feature is an on-ramp, an off-ramp, or a lane ending.

6. The computer-implemented method of claim 4, wherein the discretionary zone provides a space for the host vehicle to make a lane change maneuver based on a navigation preference associated with a road feature.

7. The computer-implemented method of claim 1, wherein selecting the kinematically-similar lane includes:
comparing the calculated flow factors for each of lanes in the implementation zone to at least one desired kinematic factor; and
identifying the kinematically-similar lane as having a flow factor that approximates the at least one desired kinematic factor.

8. The computer-implemented method of claim 1, wherein calculating the flow factors is based on a machine learning model of the vehicle data.

9. The computer-implemented method of claim 1, wherein controlling the host vehicle includes controlling a lane change of the host vehicle, from a current lane to an adjacent lane when a flow factor of the current lane indicates that traffic flow in the current lane is slower downstream than a desired speed of the host vehicle.

10. A system for cooperative smart lane selection, comprising:
a plurality of vehicles each equipped for computer communication via at least one communication network, wherein each vehicle in the plurality of vehicles is travelling along a road segment including a plurality of lanes, being parsed into a plurality of inter-lane zones including a buffer zone and an implementation zone downstream of the buffer zone, wherein each inter-lane zone includes each lane of the plurality of the lanes; and
a processor operatively connected for computer communication to the at least one communication network, wherein the processor:
receives vehicle data for the plurality of vehicles transmitted over the at least one communications network;
integrates the vehicle data into the plurality of inter-lane zones by each lane of the plurality of lanes;
calculates flow factors for each lane of the plurality of lanes with respect to the implementation zone;
selects a kinematically-similar lane from the plurality of lanes in the implementation zone based on the flow factors; and
controls a host vehicle in the buffer zone based on the selection of the kinematically-similar lane.

11. The system of claim 10, wherein the processor partitions the road segment into the plurality of inter-lane zones.

12. The system of claim 10, wherein the road segment is bounded by a first road feature and a second road feature, and wherein the first road feature and the second road feature are an on-ramp, an off-ramp, or a lane ending.

13. The system of claim 10, wherein selecting the kinematically-similar lane includes:
comparing the calculated flow factors for each lane of the plurality of lanes in the implementation zone to at least one desired kinematic factor; and
identifying the kinematically-similar lane as having a flow factor defined by a range that satisfies the at least one desired kinematic factor.

14. A non-transitory computer-readable storage medium including instructions that when executed by a processor, cause the processor to:
receive vehicle data for a plurality of vehicles as a host vehicle, wherein each vehicle in the plurality of vehicles is travelling along a road segment including a plurality of lanes, the road segment being parsed into a plurality of inter-lane zones, wherein each inter-lane zone includes each lane of the plurality of lanes, and wherein the host vehicle is in a first inter-lane zone of the plurality of inter-lane zones;
integrate the vehicle data into the plurality of inter-lane zones by lane of the plurality of lanes;
calculate flow factors for each of lanes with respect to a second inter-lane zone, of the plurality of inter-lane zones, that is downstream and adjacent to the first inter-lane zone;
select a kinematically-similar lane based on the calculated flow factors; and
control the host vehicle to initiate a lane change maneuver based on the kinematically-similar lane.

15. The non-transitory computer-readable storage medium of claim 14, wherein the vehicle data is received from a remote network, and wherein the remote network is a cellular network.

16. The non-transitory computer-readable storage medium of claim 14, wherein a flow factor of the flow factors is an average speed of a lane in the second inter-lane zone.

17. The non-transitory computer-readable storage medium of claim 14, wherein selecting the kinematically-similar lane includes:
comparing the calculated flow factors for each of lanes in the second inter-lane zone to at least one desired kinematic factor; and
identifying the kinematically-similar lane as having a flow factor defined by a range that satisfies the at least one desired kinematic factor.

* * * * *